G. F. LUCORE.
CONVEYER BELT.
APPLICATION FILED SEPT. 21, 1916.
1,212,651.
Patented Jan. 16, 1917.
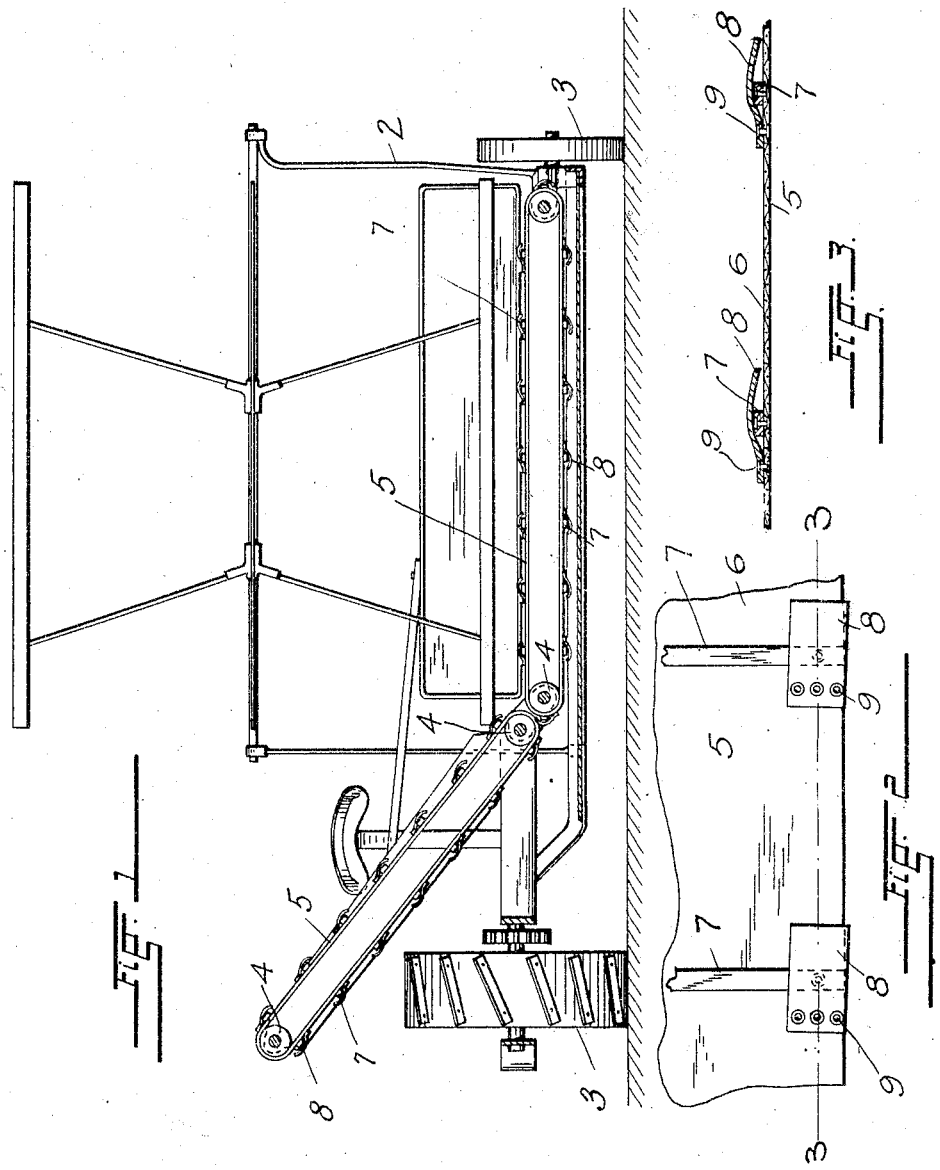
WITNESSES:—
F. H. Cuno.
L. Rhodes
INVENTOR.
G. F. LUCORE.
BY
ATTORNEY.

UNITED STATES PATENT OFFICE.

GEORGE F. LUCORE, OF ARRIBA, COLORADO.

CONVEYER-BELT.

1,212,651.   Specification of Letters Patent.   Patented Jan. 16, 1917.

Application filed September 21, 1916. Serial No. 121,465.

*To all whom it may concern:*

Be it known that I, GEORGE F. LUCORE, a citizen of the United States, residing at Arriba, in the county of Lincoln and State of Colorado, have invented certain new and useful Improvements in Conveyer-Belts, of which the following is a specification.

My invention relates to improvements in conveyer belts of the type commonly used on binders, harvesters and other agricultural machines.

As is well known to those skilled in the art to which my invention appertains, the canvas or other flexible material of which belts used for conveying material on machines of the character above referred to are composed, is frequently torn at points adjacent the ends of the cross-slats of the belts, by contact with grain or other plants along which the conveyers move in the operation of the machines of which they form part. Tangled grain, heavy forage crops and other growths of similar nature catch between the ends of the cross slats and the canvas, or on the front corner of the cross-slats of the belts and by opposing the longitudinal movement of the same, tear and otherwise injure the flexible material to the extent that it must be frequently repaired or renewed at a considerable expense and loss of time and labor. Many devices have been designed to prevent occurrences of this kind, as for example, metal plates which are bent across the ends of the conveyer-slats and fastened at both ends to the canvas. Protective devices of this character were, however, found to be objectionable owing to the fact that they interfere with the free movement of the belts around the rollers unless they are spaced from the slats to an extent that recesses are formed in which the grain catches even more readily and they were consequently discarded by the farmers as being useless and impracticable.

It is the object of the present invention to provide a guard or shield of very simple construction which effectively prevents the grain or other crops from catching between the ends of the cross-slats and the canvas of conveyer-belts on agricultural machines, without in any way interfering with the movement of the belts around the rollers upon which they are supported.

My invention contemplates with this object in view, the provision of strips of leather or other durable, flexible material which are placed loosely across the ends of the cross-slats and fastened to the canvas at their ends forward of the slats with relation to the direction in which the belt is moved in the operation of the machine upon which it is mounted.

The strips which normally lie snugly upon the ends of the slats, prevent grain or other obstructive matter from entering the spaces between the slats and the canvas, or catching over the end of the slats, and inasmuch as they are loose at their rearward ends, they lift automatically in case any foreign matter tends to pass between them and the portions of the slats they cover, and are free to move temporarily away from the surface of the canvas while the portions at which they are applied, pass around the rollers upon which the belt is supported.

An embodiment of my invention has been illustrated in the accompanying drawings in the various views of which like parts are similarly designated and in which—

Figure 1 represents an end view of an agricultural machine the conveyer belts of which are equipped with my improved guards or shields, Fig. 2, a plan view of a portion of a conveyer belt to which my invention has been applied, and Fig. 3, a section taken along the line 3—3, Fig. 2.

The reference numeral 2 designates an agricultural machine supported upon traction wheels 3 and carrying rollers 4 upon which the conveyer-belts 5 are mounted. The belts are, as usual, composed of an endless sheet of canvas 6 upon which are fastened the equidistantly disposed cross-slats 7.

The protective guards designated by the numerals 8 are composed of strips of leather or other suitable material which at one of their ends are fastened to the canvas by means of rivets 9. The guards lie normally flat across the ends of the slats as best shown in Fig. 3, and their outer edges project slantingly beyond the corresponding longitudinal edge of the canvas, as shown in Fig. 2, to engage with the grain or other growth on the field on which the machine of which the belt is part, is operated.

It will be readily seen that the guards which snugly engage the ends of the slats, effectively prevent the entrance of foreign matter in the spaces between the slats and the canvas or around the front end corner of the slats, while they are free to move away from the slats when the portions of the canvas at which they are applied, move around the rollers upon which the belt is supported.

The leather guards are preferably fastened to the canvas at their ends forward with relation to the direction of the movement of the belt in the operation of the machine, and while, ordinarily, it is sufficient to apply them only at one end of the slats, they may if so desired be applied at opposite ends of the same.

The guards may be secured to belts already in use as well as on new belts, and they may be effectively employed to prevent canvas already torn adjacent the ends of the slats, from being further injured by contact with the tangled grain or heavy crops along which it moves.

Having thus described my invention in the best and simplest form at present known to me, I desire it understood that modifications in the form or size of the guards and the method of securing them to the canvas, may be resorted to within the spirit of my invention as expressed in the following claims:

1. The combination with a conveyer belt having cross-slats, of guards composed of strips of flexible material which are fastened at one of their ends to the belt and lie across the end-portions of the slats thereof, free to separate from the belt and the slats at their opposite ends.

2. The combination with a conveyer-belt having cross-slats, of guards composed of strips of flexible material which are fastened at one of their ends to the belt and lie across the end-portions of the slats thereof, free to separate from the belt and the slats at their opposite ends, said strips overlapping at their outer edges, the longitudinal edge of the belt, adjacent which they are applied.

3. The combination with a conveyer belt having cross-slats, of guards composed of strips of flexible material which are fastened at one of their ends to the belt and lie across the end-portions of the slats thereof, free to separate from the belt and the slats at their opposite ends, the outer edges of the strips extending slantingly beyond the longitudinal edge of the belt, adjacent which they are applied.

In testimony whereof I have affixed my signature in presence of two witnesses.

GEORGE F. LUCORE.

Witnesses:
JOHN A. J. KAUFMAN,
J. F. CREEL.